(12) United States Patent
Degrazia et al.

(10) Patent No.: US 8,909,200 B2
(45) Date of Patent: Dec. 9, 2014

(54) USING FACE TRACKING FOR HANDLING PHONE EVENTS

(75) Inventors: Bradley Richard Degrazia, Seattle, WA (US); Alan Darryl Gatzke, Bainbridge Island, WA (US); Matthew R. Kuhlke, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 305 days.

(21) Appl. No.: 13/036,255

(22) Filed: Feb. 28, 2011

(65) Prior Publication Data

US 2012/0220338 A1    Aug. 30, 2012

(51) Int. Cl.
*H04M 3/42* (2006.01)
*H04M 1/725* (2006.01)
*H04M 1/64* (2006.01)
*H04M 1/60* (2006.01)
*H04M 19/04* (2006.01)

(52) U.S. Cl.
CPC .......... *H04M 1/72519* (2013.01); *H04M 1/64* (2013.01); *H04M 1/605* (2013.01); *H04M 2250/52* (2013.01); *H04M 19/045* (2013.01)
USPC ...... 455/414.1; 455/410; 455/411; 455/556.1

(58) Field of Classification Search
USPC .............. 455/410, 411, 414.1, 556.1
See application file for complete search history.

(56) References Cited

U.S. PATENT DOCUMENTS

| | | | |
|---|---|---|---|
| 8,131,848 B1* | 3/2012 | Denise | 709/224 |
| 2002/0041089 A1* | 4/2002 | Yasui | 280/735 |
| 2006/0135139 A1 | 6/2006 | Cheng et al. | |
| 2006/0192775 A1* | 8/2006 | Nicholson et al. | 345/211 |
| 2007/0036348 A1 | 2/2007 | Orr | |
| 2008/0136958 A1* | 6/2008 | Nakahara | 348/345 |
| 2009/0303176 A1* | 12/2009 | Chen et al. | 345/156 |
| 2010/0075712 A1 | 3/2010 | Sethuraman et al. | |
| 2010/0130132 A1* | 5/2010 | Lee et al. | 455/41.3 |
| 2011/0063440 A1* | 3/2011 | Neustaedter et al. | 348/143 |
| 2012/0051605 A1* | 3/2012 | Nagar et al. | 382/124 |
| 2012/0213497 A1* | 8/2012 | Lou et al. | 386/343 |

FOREIGN PATENT DOCUMENTS

EP    2207331 A1    7/2010

OTHER PUBLICATIONS

PCT/US12/26414 International Search Report and Written Opinion of the International Searching Authority dated Jun. 4, 2012.

* cited by examiner

*Primary Examiner* — Justin Lee
(74) *Attorney, Agent, or Firm* — Tucker Ellis LLP

(57) ABSTRACT

In accordance with an example embodiment, there is disclosed herein an apparatus comprising an alert device, an optical input device; and a controller coupled to the alert device and the optical input device. The controller is configured to send an alert via the alert device in response to a predetermined event. The controller is configured to recognize whether a face is detected by the optical input device, and to discontinue the alert responsive to determining that the face is being detected by the optical input device.

14 Claims, 2 Drawing Sheets

USING FACE TRACKING FOR HANDLING PHONE EVENTS

TECHNICAL FIELD

The present disclosure relates generally to controlling the operation of a telephone device.

BACKGROUND

Many devices, for example mobile devices such as smart phones or fixed devices such as wired telephones or desktop computers, continually transmit an alert to notify a user of an incoming call or message. For example, when an incoming call is received, the telephone will continue ringing until the call is answered, the caller hangs up, or if activated, the call is forwarded to voice mail. For a text message and/or a voice mail notification, the phone may emit an alarm, such as emit a predefined ring tone, vibrate and/or flash a visual indication at periodic intervals until the user reads the message.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
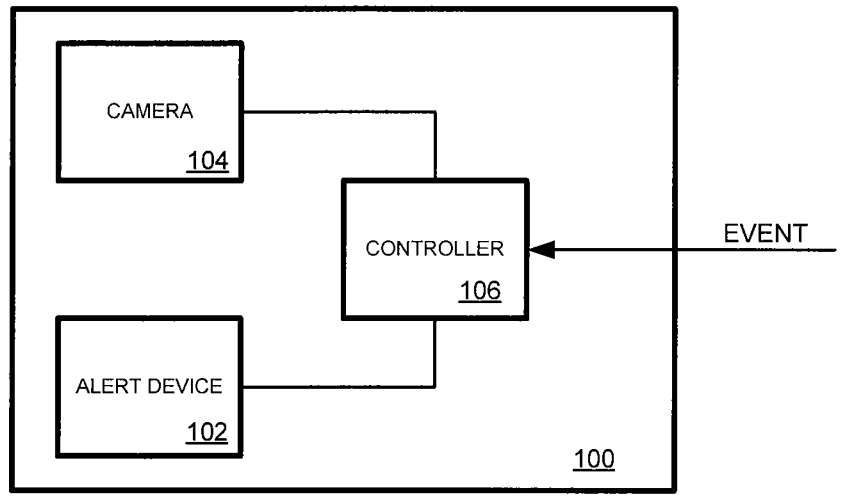
FIG. 1 is a block diagram illustrating an example of a telephone upon which an example embodiment may be implemented.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising an alert device, an optical input device; and a controller coupled to the alert device and the optical input device. The controller is configured to send an alert via the alert device in response to a predetermined event. The controller is configured to recognize whether a face is detected by the optical input device, and to discontinue the alert responsive to determining that the face is being detected by the optical input device.

In accordance with an example embodiment, there is disclosed herein a method comprising receiving data representative of an incoming communication, and activating a camera and providing an alert notification responsive to receiving the data representative of an incoming communication. The alert is discontinued responsive to detecting a face from data received from the camera.

In accordance with an example embodiment, there is disclosed herein logic encoded in at least one non-transitory tangible media for execution by a processor and when executed by processor operable to receive data representative of an incoming telephone call. The logic activates a camera and provides an audio alert responsive to receiving the data representative of an incoming telephone call. The logic discontinues the alert responsive to recognizing a face from data received from the camera.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment disclosed herein, there is described a phone with a camera that employs face tracking software. The face tracking software is capable of locating a face, determining the face's angle of rotation with respect to the phone, and the face's size relative to the size of the video frame. Optionally, the face tracking software can detect multiple faces, as well as facial recognition which will be explained in further detail below.

When an alert is triggered by the phone (such as incoming call), a face detect routine is activated concurrently with the standard ring/vibrate code. This routine uses the camera to search for a face. If a face is detected and is determined to be looking directly at the phone (based on rotation and size relative to video frame, or any other suitable criteria), further audible notification will be suppressed.

In an example embodiment, the size of a detected face relative to the size of the video frame is used to determine if the face is close to the phone to avoid triggering on a background face. In particular embodiments, facial recognition is employed to look for a face that matches the phone's owner.

In an example embodiment, multiple face tracking is employed to locate the best face in cases where there are multiple matches. For example, if a phone is being used in a room with multiple inhabitants, the facial recognition software can determine whether the closest person to the camera is the phone's owner or if any person actually looking at the phone is the owner of the phone and take the appropriate action.

In an example embodiment, the software can be configured to recognize certain gestures. For example, if the user nods their head the phone will be answered, or shake their head no to divert the call. Other gestures, such as predefined hand gestures may be employed to perform other functions such as blacklist (ignore calls from this caller) the caller. In an example embodiment, gestures are used in conjunction with facial recognition. For example, gestures form a predefined face may be processed while gestures from an unrecognized face (or from a specified face that should be ignored) may be ignored.

FIG. 1 is a block diagram illustrating an example of a device 100, such as a telephone, upon which an example embodiment may be implemented. Apparatus 100 comprises an alert device 102, an optical input device, such as a camera, 104, and a controller 106 that is coupled to alert device 102 and optical input device 104. Controller 106 may suitably comprise logic for performing one or more functions described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, the controller initiates sending an alert via alert device 102 in response to a predetermined event. The predetermined event may be any desired event, such as for example an incoming phone call, an incoming text message, an incoming a video message, an incoming instant message, and/or a new email message.

In an example embodiment, for example as illustrated in FIG. 1, the event may be received from an external device. The event may be received by an interface (not shown, see e.g., Communication interface 218 in FIG. 2). In particular embodiments, the event may be generated internally by controller 106. For example controller 106 may provide an alarm clock function. Controller 106 also activates optical device 104 in response to the predetermined event.

Controller 106 is configured to recognize whether a face is being detected by optical input device 104. Controller 106 discontinues the alert responsive to determining that a face is being detected by optical input device 104.

In an example embodiment, the optical input device comprises a camera. In particular embodiments, the optical input device may comprise a plurality of cameras. In an example embodiment, the camera may further comprise a light that would provide a visual indication when the camera is operational and/or when a face has been recognized.

Alert device 102 may suitably provide an audio alert, a visual alert, a mechanical vibration alert, or any combination of an audio alert, a visual alert, and a mechanical vibration alert. For example, alert device 102 may provide an audio ring tone and a flashing light and/or caller identification (caller ID) information in response to an incoming telephone call.

In an example embodiment, controller 106 determines a size of the face relative to a size of a video frame. This can allow controller 106 to determine whether the face is within a predefined proximity of optical input device 104. For example, if the face is far away, the user may not be acknowledging the alert. In particular embodiments, controller 106 determines an angle of the face and/or tilt of the head with respect to the optical input device. This can also allow controller 106 to determine whether the user or person detected by optical input 104 is acknowledging the alert.

In an example embodiment, controller 106 determines whether a predefined gesture was received for triggering discontinuing the alert. For example, for an incoming call, nodding the head in one direction may indicate that the call should be answered (and optionally use a speaker phone), whereas nodding the head in a second direction would indicate to ignore the phone, in which case the phone call may be forwarded to voice mail. Yet another gesture may be employed to ignore the caller and future calls from the caller will be ignored and/or automatically forwarded to voice mail.

In an example embodiment, controller 106 determines whether the face detected by optical interface 104 matches a predefined face. For example, controller 106 may determine whether the face detected on optical interface 104 belongs to a predefined user associated with apparatus 100 (e.g., the owner of a smart phone or a member of the owner's family). If the face detected by optical interface 104 is not recognized, the alert may continue. However, if the face detected on optical interfaced 104 is recognized as a predefined face (such as the owner of the phone), the alert is discontinued. In particular embodiments, controller 106 may determine whether the face is within a predefined proximity of optical input 102 (for example by comparing the size of the detected face relative to the video frame). The alert is discontinued if the user's face is within the predefined proximity of optical input 102; otherwise, the alert is maintained.

In an example embodiment, controller 106 determines a plurality of faces is detected by the optical device. Controller 106 may discontinue the alert responsive to determining that at least one of the plurality of faces is within a predetermined proximity of the optical device. For example, if no users are close to the device then the alert may be presumed unacknowledged. In particular embodiments, controller 106 determines whether any of the detected faces belong to a user associated with the device (for example the owner of the phone or a member of the owner's family). The alert is discontinued the alert responsive to determining at least one of the plurality of faces matches a predefined face. Controller 106 may further determine whether the predefined face is within a predefined proximity of optical input 104.

In an example embodiment, the alert is a notification of an incoming telephone call. After detecting a face on optical device 104, controller 106 maintains the telephone call allowing the call to be answered after discontinuing the alert. Thus, even after the alert is squelched, a user may answer the call after completing a task.

In an example embodiment, multiple types of alerts may be provided by alert device 102. After recognizing a face via optical input device 104, controller 106 may selectively discontinue some alerts while maintaining other alerts. For example, a ring tone and light emitting diode (LED) may be flashed responsive to an incoming telephone call. The user may acknowledge the alert by looking at optical input 104. Controller 106 may discontinue the ring tone; however, still provide the flashing light while the call is active. In other embodiments, a mechanical vibration may be periodically initiated after the alert has been acknowledged.

Figure 2:
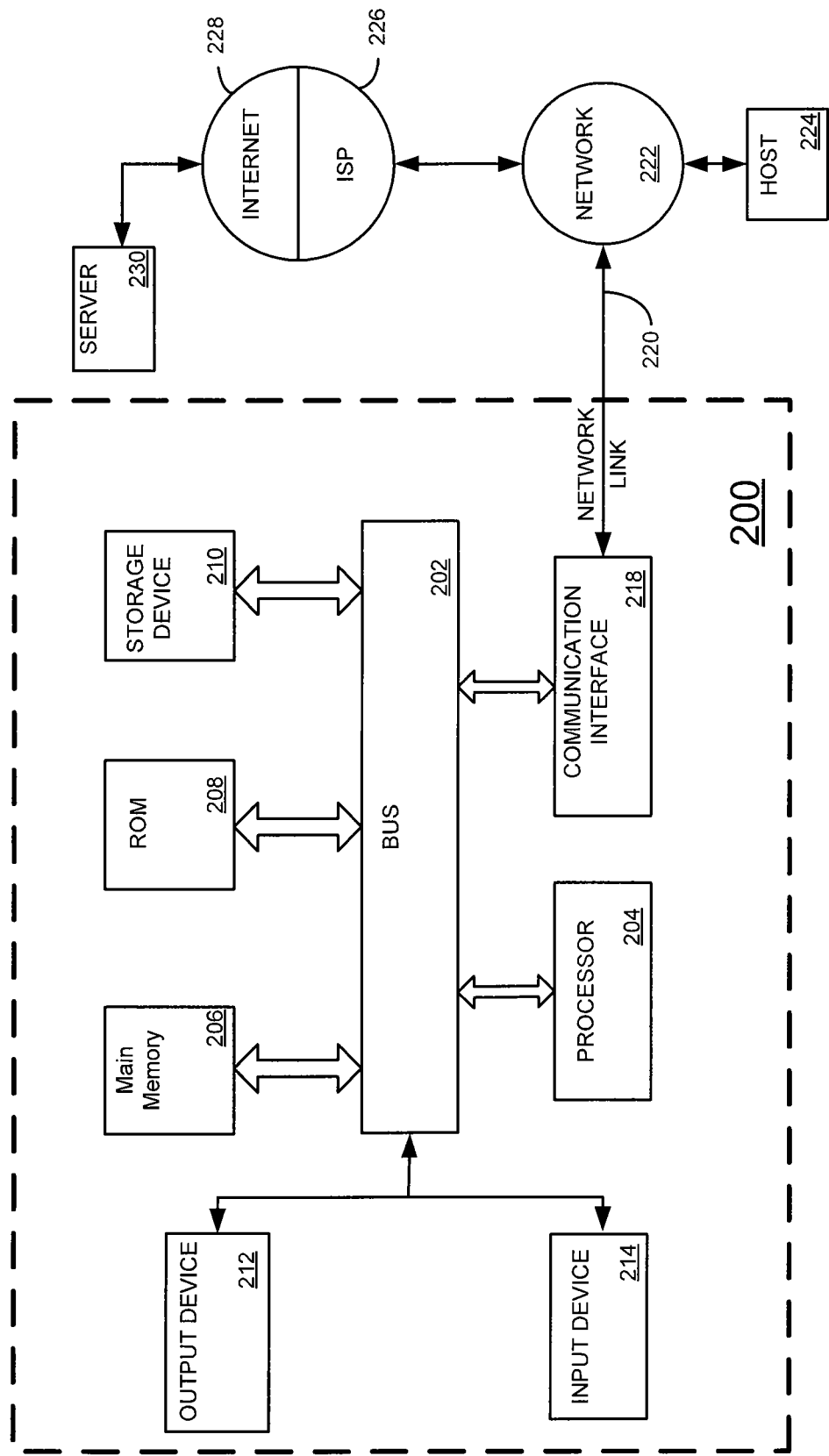
FIG. 2 illustrates an example of a computer system upon which an example embodiment may be implemented.

FIG. 2 illustrates an example of a computer system 200 upon which an example embodiment may be implemented. Computer system 200 may be employed to implement controller 106 in FIG. 1

Computer system 200 includes a bus 202 or other communication mechanism for communicating information and a processor 204 coupled with bus 202 for processing information. Computer system 200 also includes a main memory 206, such as random access memory (RAM) or other dynamic storage device coupled to bus 202 for storing information and instructions to be executed by processor 204. Main memory 206 also may be used for storing a temporary variable or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to an output device 212 such as a video display for displaying information to a computer user, an audio device which may provide one or more predefined tones, and/or a mechanical device which may cause vibration. Computer system 200 may also be coupled to an input device 214, such as an optical input device, for example a camera.

An aspect of the example embodiment is related to the use of computer system 200 for using face tracking for handling phone events. According to an example embodiment, using face tracking for handling phone events is provided by computer system 200 in response to processor 204 executing one or more sequences of one or more instructions contained in main memory 206. Such instructions may be read into main memory 206 from another computer-readable medium, such as storage device 210. Execution of the sequence of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 204 for execution. Such a medium may take many forms, including but not limited to non-volatile media, and volatile media. Non-volatile media include for example optical or magnetic disks, such as storage device 210. Volatile media include dynamic memory such as main memory 206. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 200 also includes a communication interface 218 coupled to bus 202. Communication interface 218 provides a two-way data communication coupling computer system 200 to a network link 220 that is connected to a network 222. Communication interface 218 may be any suitable type of interface for communicating with network 222. For example, communication interface 218 may be a local area network (LAN) card to provide a data communication connection to a compatible LAN. As another example, communication interface 218 may be an integrated services digital network (ISDN) card or a modem to provide a data communication connection to a corresponding type of telephone line. Wireless links may also be implemented. In any such implementation, communication interface 218 sends and receives electrical, electromagnetic, or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communications through the worldwide packet data communication network, now commonly referred to as the "Internet" 228.

Computer system 200 can send messages and receive data, including program codes, through the network(s), network link 220, and communication interface 218. In the Internet example, a server 230 might transmit a requested code for an application program through Internet 228, ISP 226, local network 222, and communication interface 218. In accordance with an example embodiment, one such downloaded application provides for using face tracking for handling phone events as described herein.

Figure 3:
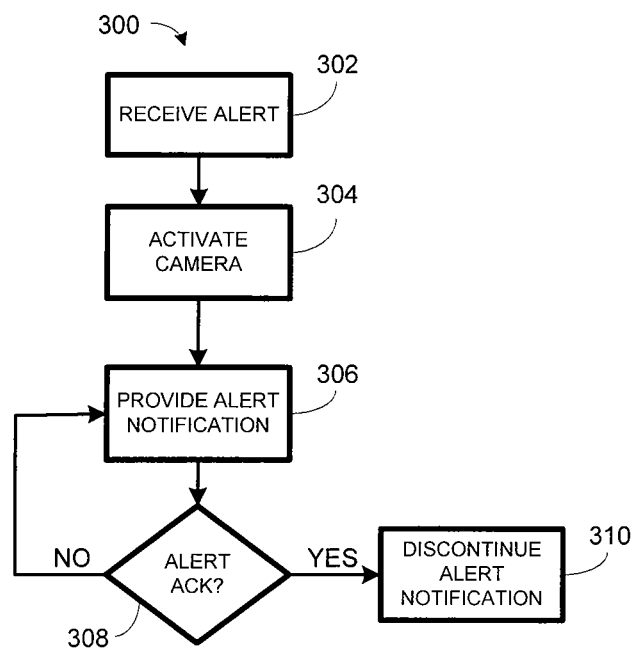
FIG. 3 illustrates an example of a methodology for operating a communication device.

In view of the foregoing structural and functional features described above, a methodology 300 in accordance with an example embodiment will be better appreciated with reference to FIG. 3. While, for purposes of simplicity of explanation, methodology 300 of FIG. 3 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect of an example embodiment. The methodology described herein is suitably adapted to be implemented in hardware, software, or a combination thereof.

At 302, data representative of an incoming communication (or alert) is received. The alert may be a notification for an incoming phone call, text message, video message, instant message, and/or any other type of event. At 304, a camera is activated. The camera may be employed for face tracking.

At 306, an alert notification is provided. The alert notification may be any one of a video alert such as a flashing light or a display with caller ID data, an audio alert such as a ringtone, a mechanical alert such as a vibration, or any combination of the aforementioned alert types.

At 308, a determination is made whether the alert was acknowledged (alert ack?). In an example embodiment, the alert is considered acknowledged responsive to determining that a face was detected by the camera.

In an example embodiment, additional criteria may be employed to determine whether the alert was acknowledged. For example, additional criteria may include, but is not limited to whether the face is close enough (within a predefined proximity), and/or the angle of the face or head tilt detected by the camera may be considered. In an example embodiment, a determination may be made whether the face has moved so that the camera may ignore stationary objects such as posters.

In an example embodiment, the size of the face detected is compared relative to a size of a video frame. This can help determine whether the face is within a predefined proximity of the camera. For example, if the face is far away, the user may not be acknowledging the alert. In particular embodiments an angle of the face and/or tilt of the head with respect to the camera may be employed in considering whether the alert was acknowledged.

In an example embodiment, receipt of a predefined gesture can be used for determining whether the alert was acknowledged. For example, for an incoming call, nodding the head in one direction may indicate that the call should be answered (and optionally use a speaker phone), whereas nodding the head in a second direction would indicate to ignore the phone, in which case the phone call may be forwarded to voice mail. Yet another gesture may be employed to ignore the caller and future calls from the caller will be ignored and/or automatically forwarded to voice mail.

In an example embodiment, determining whether the alarm was acknowledged may suitably comprise determining whether the face detected by the camera matches a predefined face. For example, whether the face detected by the camera belongs to a predefined person such as the owner of a smart phone or a member of the family. In particular embodiments the proximity of the face may also be considered, for example whether the face is within a predefined proximity (for example by comparing the size of the detected face relative to the video frame).

In an example embodiment, a plurality of faces is detected by the camera. A further determination may be determining at least one of the plurality of faces is within a predetermined proximity of the optical device. In particular embodiments, a determination is made whether any of the detected faces belong to a user associated with the device (for example the owner of the phone or a member of the owner's family). In an example embodiment a further determination is made whether at least one of the plurality of faces that matches a predefined face is within a predefined proximity of the camera.

If at 308 a determination is made that the alert was not acknowledged (NO), the alert continues as illustrated at 306. If, however, at 308, a determination is made that the alert was acknowledged (YES), at 310 the alert is discontinued.

In an example embodiment, multiple types of alerts may be provided. At 310, some alerts may be selectively discontinued while maintaining other alerts. For example, a ring tone and light emitting diode (LED) may be flashed responsive to an incoming telephone call. After the call is acknowledged, the ring tone may be discontinued; however, the flashing light may still be provided while the call is active. In other embodiments, a mechanical vibration may be periodically initiated after the alert has been acknowledged.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
an alert device;
an optical input device; and
a controller coupled to the alert device and the optical input device;
wherein the controller is configured to send an alert via the alert device in response to incoming calls;
wherein the controller is configured to recognize whether a face is detected by the optical input device;
wherein the controller is configured to determine a proximity of the face to the camera;
wherein the controller is configured to determine whether the face is within a predefined proximity to the camera;
wherein the controller is configured to discontinue the alert responsive to determining that the face is being detected by the optical input device and is within the predefined proximity;
wherein the controller answers calls responsive to detecting a head nodding in a first direction;
wherein the controller diverts calls to voice mail responsive to detecting the head nodding in a second direction; and
wherein the controller discontinues the alert responsive to detection of a face from data received from the optical input device and detecting head nodding in the second direction.

2. The apparatus of claim 1, wherein the optical input device is a camera.

3. The apparatus of claim 1, wherein the alert device provides one of a group of alerts, the group consisting of an audio alert, a visual alert, and a mechanical vibration alert.

4. The apparatus of claim 1, wherein the controller determines a size of the face relative to a size of a video frame in order to determine proximity of the face to the optical input device.

5. The apparatus of claim 1, wherein the controller determines an angle of the face with respect to the optical input device.

6. The apparatus of claim 1, wherein the controller determines whether the face detected on the optical input device matches a predefined face; and
wherein the controller discontinues the alert responsive to recognizing the face received via the optical input device and the face matches the predefined face.

7. The apparatus of claim 1, wherein the alert is a notification of an incoming telephone call; and
wherein the controller maintains the telephone call allowing the call to be answered after discontinuing the alert.

8. The apparatus of claim 1, wherein the controller determines a plurality of faces are detected by the optical input device; and
wherein the controller discontinues the alert responsive to determining at least one of the plurality of faces is within a predetermined proximity of the optical input device.

9. The apparatus of claim 1, wherein the controller determines a plurality of faces are detected by the optical input device; and
wherein the controller discontinues the alert responsive to determining at least one of the plurality of faces matches a predefined face.

10. The apparatus of claim 1, wherein the controller discontinues the alert responsive to determining the one of the plurality of faces matching the predefined face is within a predetermined proximity of the optical input device.

11. The apparatus of claim 1, wherein an optical and audio alert are provided by the alert device; and
wherein the controller discontinues the audio alert but maintains the optical alert responsive to determining that the face is being detected by the optical input device.

12. The apparatus of claim 1, wherein future calls from a caller are ignored, diverted to voice, or ignored and diverted to voice mail in response to a predefined gesture.

13. A method, comprising:
receiving data representative of an incoming communication at a device;
activating a camera associated with the device responsive to receiving the data representative of an incoming communication;
providing an alert notification responsive to receiving the data representative of an incoming communication;
detecting a plurality of faces via the camera;
determining a proximity of a face of the plurality thereof to the camera;
determining whether a selected face from the plurality of users is that is closest to the camera belongs to a user associated with the device;
discontinuing the alert responsive to determining the selected face is closest to the camera and is within a predefined proximity of the camera;
communication is for an incoming telephone call, the method further comprising:
determining whether a predefined gesture was received via the camera; and
discontinuing the alert responsive to detecting a face from data received from the camera and detecting the predefined gesture; and
maintaining the telephone call after discontinuing the alert.

14. A method comprising:
receiving data representative of an incoming communication at a device;

activating a camera associated with the device responsive to receiving the data representative of an incoming communication;
providing an alert notification responsive to receiving the data representative of an incoming communication;
detecting a plurality of faces via the camera;
determining a proximity of a face of the plurality thereof to the camera;
determining whether a selected face from the plurality of users is that is closest to the camera belongs to a user associated with the device;
discontinuing the alert responsive to determining the selected face is closest to the camera and is within a predefined proximity of the camera;
determining whether a predefined gesture was received via the camera; and
discontinuing the alert responsive to detecting a face from data received from the camera and detecting the predefined gesture; and
forwarding the telephone call to voice mail.

* * * * *